United States Patent [19]
Harper

[11] Patent Number: 5,348,124
[45] Date of Patent: Sep. 20, 1994

[54] ACTIVE CONTROL OF VIBRATION

[75] Inventor: Mark F. L. Harper, Cambridge, United Kingdom

[73] Assignee: Active Noise and Vibration Technologies, Inc., Phoenix, Ariz.

[21] Appl. No.: 809,704

[22] Filed: Dec. 17, 1991

Related U.S. Application Data

[63] Continuation-in-part of Ser. No. 492,817, Mar. 13, 1990, abandoned.

[30] Foreign Application Priority Data

Mar. 16, 1989 [GB] United Kingdom ............... 8906070

[51] Int. Cl.$^5$ .............................................. F16F 7/10
[52] U.S. Cl. ........................................ 188/378; 52/1; 244/158 R; 267/136; 248/550; 188/382
[58] Field of Search ............... 188/378, 379, 380, 382; 267/136; 248/550, 638, 603, 562, 636, 48, 49; 73/663, 668; 52/1, 167 R, 167 DF; 244/17, 19, 158 R; 901/27, 22, 29; 138/104, 106, 107, 178

[56] References Cited

U.S. PATENT DOCUMENTS

| | | | |
|---|---|---|---|
| 2,964,272 | 12/1960 | Olson | 248/550 |
| 3,128,330 | 4/1964 | Grasser | 188/378 X |
| 3,703,999 | 11/1972 | Forys et al. | 188/380 X |
| 3,991,959 | 11/1976 | Albus | 188/378 X |
| 4,011,694 | 3/1977 | Langford | 52/1 |
| 4,083,433 | 4/1978 | Geohegan, Jr. et al. | 188/382 |
| 4,576,356 | 3/1986 | Kucera | 188/380 X |
| 4,601,449 | 7/1986 | Sharbaugh | 188/171 X |
| 4,778,037 | 10/1988 | Papadopoulos | 267/136 X |
| 4,795,123 | 1/1989 | Forward et al. | 188/378 X |
| 4,817,768 | 4/1989 | Schumacher | 267/136 X |
| 4,988,244 | 1/1991 | Sheldon et al. | 901/22 X |
| 5,022,628 | 6/1991 | Johnson et al. | 248/550 X |
| 5,028,180 | 7/1991 | Sheldon et al. | 901/22 X |
| 5,046,290 | 9/1991 | Ishit et al. | 52/1 |
| 5,052,529 | 10/1991 | Sutcliffe et al. | 188/378 |
| 5,107,634 | 4/1992 | Onoda et al. | 52/167 DF |
| 5,116,190 | 5/1992 | Silke | 901/29 X |
| 5,131,611 | 7/1992 | Vollaro | 248/550 X |
| 5,209,326 | 5/1993 | Harper | 188/378 |

FOREIGN PATENT DOCUMENTS

| | | | |
|---|---|---|---|
| 1222538 | 4/1986 | U.S.S.R. | 901/27 |
| 1563978 | 5/1990 | U.S.S.R. | 901/27 |
| 8701645 | 3/1987 | World Int. Prop. O. | 901/27 |

OTHER PUBLICATIONS

Experimental Demonstration of the Control of Flexible Structures; J. Guidance 7(5) 1984, pp. 527–534, Schaechter and Eldred.

Active Control of Flexural Vibrations, J. Sound and Vib. 114(2), 1987, pp. 253–270.

Fundamental University Physics–II: Fields and Waves; Addison Wesley USA 1967: Chapter 22, Alonzo and Finn.

Fundamentals of Acoustics, Third Edition, Wiley, New York 1982, Chapter III, Kinsler Frey Coppens and Sanders.

A Multiple Error LMS Algorithm and Its application to the Active Control of Sound and Vibration; IEEE Trans ASSP, 35, No. 10, 1987, pp. 1423–1434, Elliott et al.

*Primary Examiner*—Douglas C. Butler
*Attorney, Agent, or Firm*—Lee, Mann, Smith, McWilliams, Sweeney & Ohlson

[57] ABSTRACT

A method of and system for active vibration control in an elongate member such as a pipe (2), wherein an actuator which comprises at least one constrictive element (3) capable of changing its length is attached between flanges (1) spaced along the member and is controlled to produce deformations of the member which inhibit the transmission of unwanted vibration from the member to one side of the attached actuator to the other side.

27 Claims, 3 Drawing Sheets

ACTIVE CONTROL OF VIBRATION

FIELD OF INVENTION

This application is a continuation-in-part of U.S. application Ser. No. 492,817 filed on Mar. 13, 1990, now abandoned.

This invention concerns methods and apparatus for the active control of vibration particularly in the isolation of elongate members or pipes from unwanted vibration.

BACKGROUND TO THE INVENTION

In many situations, unwanted mechanical vibration can be transmitted from a source via pipes, beams or other flexible members. One example is the transmission of vibrations from a spacecraft or satellite to antennae or other sensitive equipment mounted on it at the end of a thin supporting beam. Typically such a beam will not be damped and the disturbing vibrations will cause disturbances at the antenna or vibration in the equipment and so interfere with its normal function.

Another example is the transmission of vibration from heavy machinery such as ships engines via pipework connected to it.

Various publications deal with the reduction of transverse vibrations of a beam by employing multiple actuators to introduce artificial damping, and thus to gradually remove the energy of vibration from the beam. In particular, reference is made to U.S. Pat. No. 4,817,768 to Schumacher. Such a system removes vibrational energy from a beam at a rate dependent on the energy it contains, which leads to an exponential decay in its level of vibration with time after the energy has been injected. If venergy is injected continuously then a system such as that disclosed in Schumacher will only reduce the level of vibration of the beam, but cannot entirely remove it.

Various further publications deal with the cancellation of transverse modes of vibration in beams using multiple actuators.

In particular reference is made to Schaechter, D B, Eldred, D B "Experimental Demonstration of the Control of Flexible Structures", J Guidance 7 (5) 1984, pp 527–534, and Mace, B R, "Active Control of Flexural Vibrations", J Sound and Vib. 114 (2), 1987, pp 253–270.

It is an object of the present invention to prevent the transmission of low frequency vibrational energy along the beam regardless of whether it involves transverse or other types of vibration, for example torsional vibration about the beam axis or compressional vibration parallel to the axis. By the use of the invention the energy is not absorbed but is caused to return to its source, leaving the portion of the beam which it is desired to protect from vibration preferably entirely undisturbed. According to one aspect of the invention this is accomplished by a single compound actuator attached to the beam.

For the purposes of this application an 'actuator' is considered to be a device capable of imposing vibrational forces on a body to which it is attached, the forces being entirely controllable by an electrical signal supplied to the actuator.

The term 'low frequency' will be clarified and given a precise meaning in the section below dealing with a preferred embodiment of the invention.

Items such as beams and pipes and the like flexible members will herein also be referred to as elongate members.

Furthermore, references herein to a source of vibration are to be understood as meaning any source whether translational, torsional or compressional,

SUMMARY OF THE INVENTION

The invention provides a means whereby low frequency vibrations can be prevented from propagating along an elongate member. This is done by rigidly attaching at two separated points along the member the ends of an actuator which is capable of producing forces and movements in any desired directions and in any combination between its two ends. The actuator is sufficiently powerful so that it can produce small distortions in that portion of the elongate member between the attachment points of its ends. Thus it can be seen that, provided an appropriate control signal is applied to the actuator, any desired small relative displacement of the attachment points may be produced.

If low frequency vibrational waves now travel along the beam from left to right, they will cause some displacement, linear or rotational or both, at the right-hand attachment point of the actuator. If a control signal is now applied to the actuator which in the absence of the vibrational waves would have caused an equal and opposite displacement of the right-hand attachment point, then by the principle of wave superposition the result will be that the attachment point does not move (see e.g. Alonso & Finn, 'Fundamental University Physics - II: Fields & Waves', Addison Wesley, USA 1967: Chapter 22). This will therefore prevent the vibrational waves from travelling to the right of the attachment point.

BRIEF DESCRIPTION OF THE DRAWINGS

The invention will now be described, by way of example only, with reference to the accompanying drawings in which.

DESCRIPTION OF PREFERRED EMBODIMENT

Figure 1:
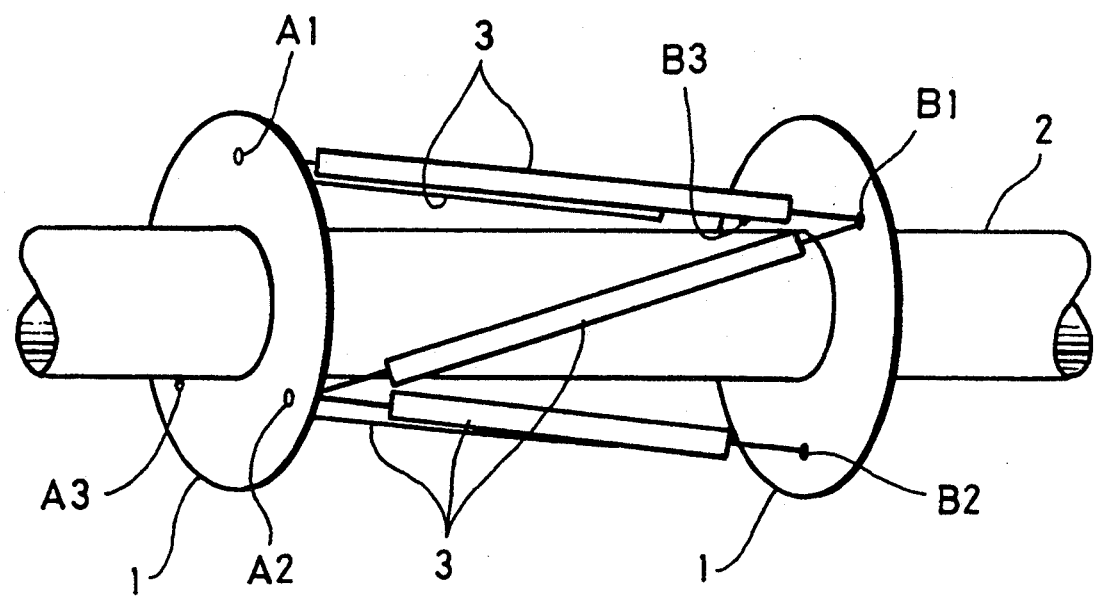
FIG. 1 is a perspective view of an embodiment of the invention as applied to a pipe of a diesel engine.

The embodiment of invention shown in FIG. 1 is applied to control vibration transmitted from a marine diesel engine (not shown) along a metal pipe 2 carrying cooling water to and from the engine. The ends of a compound actuator 3 are secured to annular flanges 1 rigidly attached to the cooling pipe 2. The flanges are conveniently made of the same metal as the pipe 2 and are welded to it. They may be rendered stiff by attaching radial ribs in well known manner. Between the flanges 2 is attached the compound actuator in the form of six constrictive elements 3. These are elements which act to change their lengths in response to an applied control signal. They may for example be magnetostrictive devices such as the PM-50 device produced by Edge Technologies Inc. of Ames, Iowa, USA. Alternatively they may be hydraulic elements such as one of the wide range manufactured by Zonic Corp. of Milford, Ohio. Alternatively they may consist of piles of piezoelectric ceramics in the manner commonly used to make projectors Any of these devices are capable of producing large forces in the process of changing their lengths, and are for this reason convenient for the present invention, as will become evident below.

Figure 2:
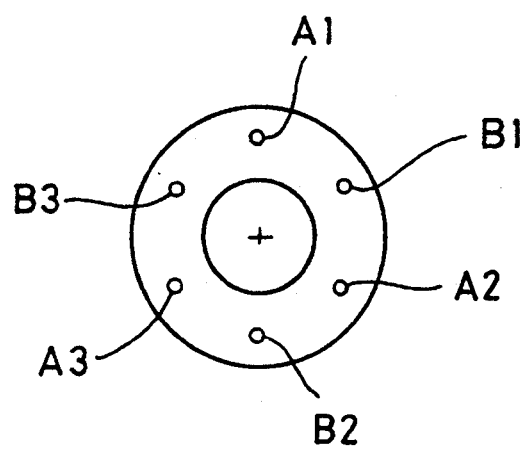
FIG. 2 is an end view of one of the flanges on the pipe of FIG. 1, showing the attachment points of the actuator on both flanges.

The six elements 3 are attached to the left-hand flange 1 at three points A1–3 which all lie at the same radius from the pipe axis and at angles of 120° around the flange. They are also attached to the right-hand flange at three points B1–3 which are similarly distributed except that they are rotated 60° about the pipe axis with respect to A1–3. This is indicated in the end view shown in FIG. 2.

The constrictive elements are attached between these points as follows:
One between A1 and B1
One between A1 and B3
One between A3 and B3
One betweem A3 and B2
One between A2 and B2
One between A2 and B1

The connections between the elements 3 and the flanges 1 are such that any element 3 exerts a force on either flange 1 only in a direction parallel to its length. This may be conveniently arranged by connecting the elements 3 to the flanges 2 by means of known ball-and-socket joints at either end of each element 3.

It will be apparent that when a control signal is applied to one or more of the constrictive elements 3, the forces they produce will tend to cause a relative movement of the flanges 1. To cause such a movement, the elements 3 must be capable of overcoming the mechanical impedance of the section of pipe between the flanges. Means of calculating the impedance of a pipe section at low frequencies are well known to those versed in the art of vibrations analysis (see for example "Fundamentals of Acoustics", Kinsler, Frey, Coppeus & Saunders, third edition, Wiley, New York 1982, Chapter 3). At low frequencies, any fluid in the pipe can be considered as contributing a mass-loading to transverse vibrations of the pipe, while not affecting longitudinal (compressional) or torsional vibrations. The requirement of the elements 3 is that they should be sufficiently powerful to produce vibrational displacements and rotations at the flange 1 furthest from the source of vibrations which are equal and opposite to the vibrational displacements and rotations produced by the source.

Using the information given above, a competent engineer will be able to select appropriate types of element 3. The choice is not unique: the impedance of the pipe section which the elements 3 must overcome may be altered by judicious choice of the separation of the flanges 1 along the pipe axis, and the forces required of the actuators may be minimised by careful choice of the radius of the attachment points A1–3, B1–3. Thus, for example, the dimensions of the elements may be chosen to suit the particular application, and the force requirements of the elements 1 can then be deduced, and a suitable type of element selected.

In order to be effective in the control of vibration, the actuator described above must be used as part of an active control system.

Figure 3:
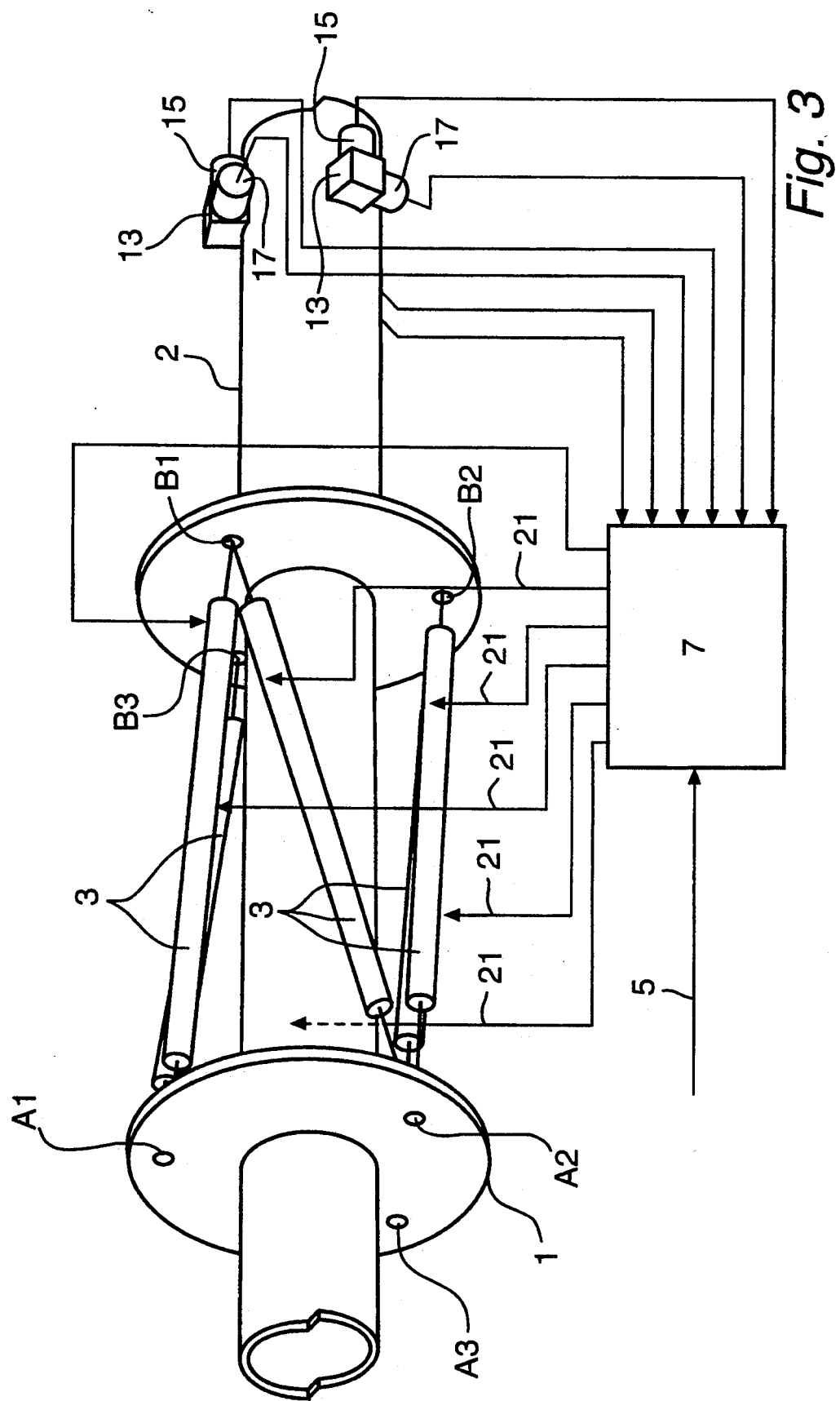
FIG. 3 is a perspective view similar to FIG. 1 and showing the control circuit and vibration sensors.

A suitable control system is shown in FIG. 3 and will now be described.

Control signals 21 for the actuator elements 3 are determined by an electronic controller 7. Suitable principals of operation of such a controller are well-known in the literature (see e.g. Elliott, S. J., et al "A Multiple-Error LMS Algorithm and its Application to the Active Control of Sound and Vibration", IEE Trans ASSP, 35, No. 10, 1987, pp 1423–1434) and a suitable device is the type TX6000 controller constructed by Topexpress Ltd of Cambrige, UK. The control signals 21 may require electrical amplification by an amplifier (not shown) whose type will be determinded by the type of actuator element 3 used. Such amplifier devices are readily available commercially.

The controller 7 receives information on the vibrations being generated by the diesel engine (not shown in the drawings) via a synchronisation signal 5 derived from a tachometer attached to the diesel main shaft (not shown). A suitable tachometer is the R5000 shaft encoder supplied by Robing & Meyers Inc of Goleta, Calif. The controller 7 filters the tachometer signal 5 in order to derive the control signals 21 to the actuator elements 3. The controller adapts the filtering process in order to minimise the vibrations as detected by a set of accelerometers 15, 17 which are securely mounted on the pipe 2 on the right-hand side of the actuator and are separated from it by a finite distance.

Accelerometers are devices well known to those versed in the art of vibration control and may be obtained commercially, for example from Endevco Corp. of San Juan Capistrano, Calif.

Figure 4:
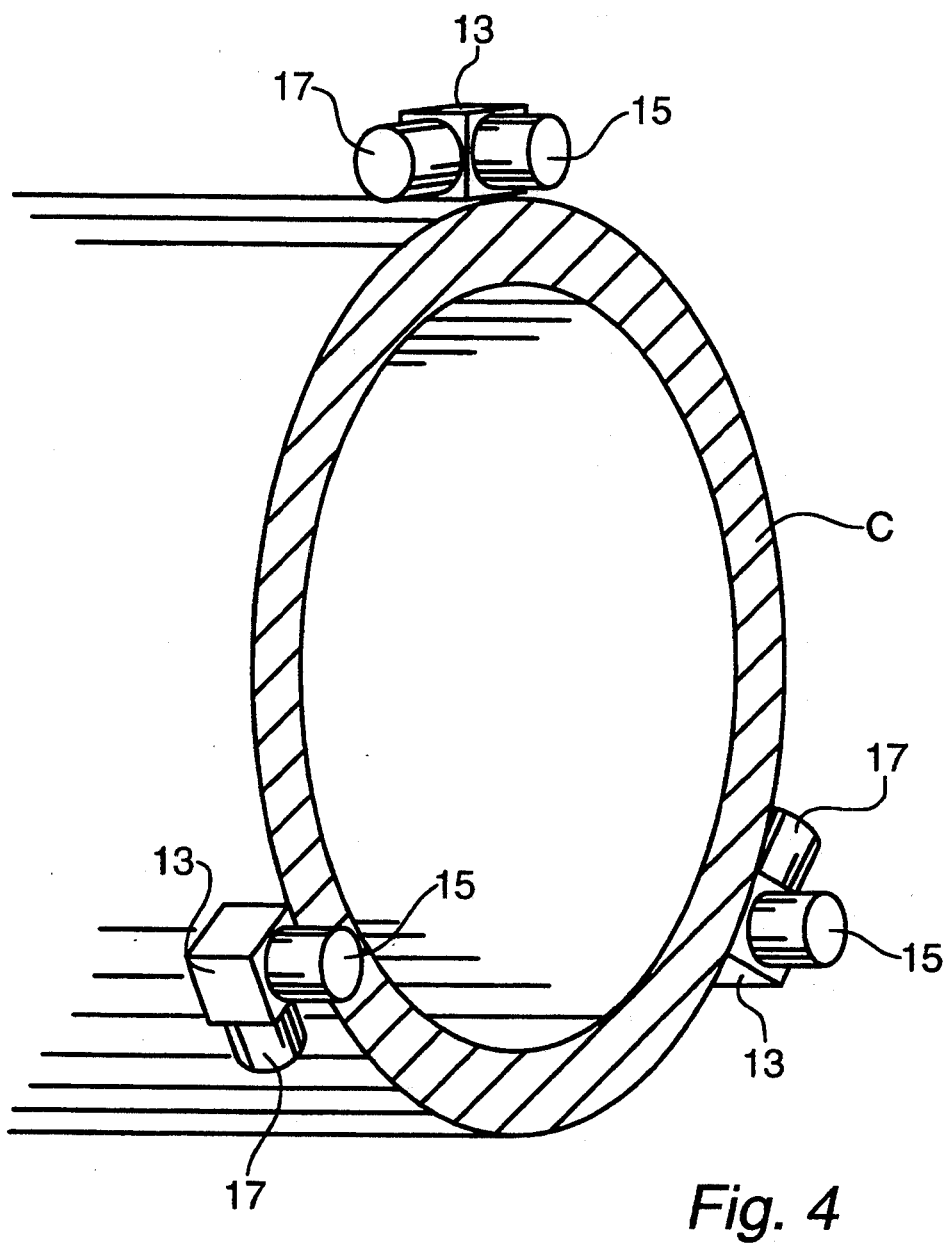
FIG. 4 is an enlarged perspective view of the sensors.

A suitable arrangement of the accelerometers 15, 17 is indicated in FIG. 4, which shows a cross-section C through the pipe 2 at the accelerometers. Three aluminium blocks 13 are attached rigidly to the circumference of the pipe 2 at approximately regular intervals, and with one face in the plane of the section C. As suggested by the figure, the blocks 13 are of appreciably smaller dimension than the cross-section of the pipe. Two accelerometers 15, 17 are attached to each block: one 17 with its base attached to a face parallel to the axis of the pipe 2 and another 15 with its base attached to the face in the plane of the cross-section. Following normal practice in the art of vibration measurement, the three blocks 13 are glued to the pipe 2 while the accelerometers are attached to them by means of threaded studs.

In FIG. 3 one block and two accelerometers are obscured by the pipe 2.

This arrangement allows six degrees of freedom of vibration of the section C to be observed by measuring the accelerometer outputs.

The invention is primarily intended to be used in connection with elongate members of hollow section e.g. pipes for vibration control at low frequencies. By the term "low frequencies" is meant frequencies below the cut-on frequency for any mode of vibration of the pipe wall, which necessarily involves a distortion of its cross-section from its normal shape. For a circular pipe this implies a distortion into a non-circular form.

By "cut-on frequency" the usual meaning is intended, namely the lowest frequency at which a vibrational mode can propagate and transport energy along a structure (in this case the cooling-water pipe). It is well-known to those versed in the art of vibration analysis that below its cut-on frequency, a mode does not transport energy but caused only a disturbance which dies away exponentially with distance from its source. The distance over which it dies away becomes shorter as frequency is reduced (see for vexample Achenbach J. S., 'Wave Propagation in Elastic Solids', North-Holland & Elsevier, Fourth edition 1984).

If the flanges 1 of the actuator are sufficiently rigid, the actuator will be able to affect only those vibrational modes which do not distort the pipe 2 cross-section. This is the reason for giving the (compound) actuator six elements 3 so that each rigid flange 1 will have only six degrees of freedom of motion (including three of translation along the Cartesian axes).

Any desired motion of the undistorted pipe cross-section at each flange 1 can therefore be produced by the actuator.

Inevitably, however, the flanges 1 will be only imperfectly rigid, and the action of the (compound) actuator 3 may produce some distortion of the pipe 2 cross-section at the right-hand flange 1 in FIG. 3. This may excite one of the aforementioned mechanical modes which depend on such distortion. However, provided the control system is being used only below the cut-on frequency of any such mode, the corresponding distortions will die away to the right of the actuator. However, care must be taken that the accelerometers 15, 17 are placed sufficiently far to the right of the actuator 1, 3 so that they do not detect this distortion. Otherwise the control systems 1, 3, 7, 15, 17 will erroneously react to the signals from the accelerometers 15, 17 as if they resulted from modes which do not distort the pipe 2 cross-section, and consequently will not perform as desired. The distance of the accelerometers 15, 17 from the actuator 1, 3 must therefore be set with regard to the distorting mode whose rate of decay along the pipe is least rapid. This may be deduced by the methods described by Achenbach, referred to above.

It is to be emphasised that the use of this invention has wide applications and is not limited to diesel engine cooling-water pipes discussed above. For example, the system may be incorporated in the mounting system of an engine or other machine which it is desired to isolate in terms of vibration. In this case the ends of the actuator may be attached to the machine above a mount and to the seating below the mount. The invention may then be used in a manner similar to that described above to prevent the transmission of vibration forces from the machine to the seatings.

I claim:

1. An active vibration control system for preventing the transmission of vibrations from a source of vibrations along an elongate member, comprising:
   sensing means for sensing vibrations in the elongate member;
   a length-changing actuator;
   means for attaching the actuator between two attachment points spaced longitudinally apart along the elongate member; and
   an electronic controller,
wherein the electronic controller is responsive to a signal from the sensor means to control the actuator to apply forces to the elongate member so as to create a reflection region in the elongate member from which vibrations, propagating along the elongate member, are reflected to thereby isolate a region of the elongate member, separated from the source of vibrations by the length-changing actuator.

2. A system according to claim 1, including a further length-changing actuator and means for attaching the further actuator between two further attachment points angularly spaced from said attachment points spaced longitudinally apart along the elongate member.

3. A system according to claim 1, wherein said actuator comprises an electrodynamic actuator.

4. A system according to claim 1, wherein said actuator comprises a piezoelectric actuator.

5. A system according to claim 1, wherein said actuator comprises a hydraulic actuator.

6. A system according to claim 1, wherein said actuator comprises a magnetostrictive actuator.

7. A system according to claim 1, wherein the elongate member is of finite length and one of said attachment points lies at one end of the elongate member.

8. A system according to claim 1, in which said elongate member comprises a pipe having spaced radially extending flanges, said attachment points being disposed on said flanges.

9. A system according to claim 1, wherein the sensing means is arranged to sense vibrations in the region of the elongate member to be isolated from vibrations propagating along the elongate member from said source of vibrations.

10. A system of active vibration control comprising an elongate member having first and second ends, a source of vibrations applying vibrations to the first end of the elongate member, a pair of longitudinally spaced flanges rigidly secured to the elongate member between said ends, a compound length-changing actuator, comprising a plurality of length-changing actuators, connected between said flanges, a vibration sensor secured to the second end of elongate the member for sensing vibrations, in the elongate member, and an electronic controller connected to said sensor for generating control signals, said control signals being applied to the actuator to apply forces to the elongate member so as to create a reflection region from which vibrations propagating along the elongate member from said source of vibrations, are reflected to thereby isolate the second end of the elongate member from said vibrations.

11. A system according to claim 10 in which the elongate member is a pipe of an engine, and the sensor comprises a plurality of accelerometers secured around the pipe.

12. A system according to claim 11 in which said vibrations are at frequencies below the cut-on frequency of modes of vibration of the pipe wall.

13. A method of active vibration control of an elongate member whereby vibrations, from a source of vibrations acting on one region of the elongate member, are prevented from being transmitted to another region of the elongate member, comprising the steps of:
   (a) attaching a length-changing actuator to the elongate member at separate attachment points, the attachment points being longitudinally spaced along a section of the elongate member;
   (b) arranging sensing means to sense vibrations in a region of the elongate member; and
   (c) processing signals produced by the sensing means to produce control signals to control the length-changing actuator to apply forces to the elongate member so as to create a reflection region from which vibrations, propagating along the elongate member from the source of vibrations, are reflected to thereby isolate a region of the elongate member, separated from the source of vibrations by the length-changing actuator, from the vibrations.

14. A method according to claim 13, wherein the signals produced by the sensing means are processed by an adaptive control system to produce said control signals.

15. A method according to claim 13, wherein step (b) comprises arranging sensing means to sense vibrations in the region of the elongate member to be isolated from the vibrations.

16. A method of active vibration control of an elongate member whereby vibrations, from a source of unwanted vibrations acting on one region of the elongate member, are prevented from being transmitted to another region of the elongate member, comprising the steps of:
  (a) attaching a compound actuator, comprising a plurality of length-changing actuators, between two sets of attachment points, said sets being longitudinally spaced along a section of the elongate member;
  (b) arranging sensing means to sense vibrations in a region of the elongate member; and
  (c) processing signals produced by the sensing means to produce control signals to control the compound actuator to apply forces to the elongate member so as to create a reflection region from which vibrations, propagating along the elongate member from the source of vibrations, are reflected to thereby isolate a region of the elongate member, separated from the source of vibrations by the compound actuator, from the vibrations.

17. A method according to claim 16, wherein the signals produced by the sensing means are processed by an adaptive control system to produce said control signals.

18. A method according to claim 16, wherein step (b) comprises arranging sensing means to sense vibrations in the region of the elongate member to be isolated from said vibrations.

19. A method of active vibration control of an elongate member whereby a source of vibrations acting on one region of the elongate member is prevented from being transmitted to another region of the member, comprising the steps of:
  (a) attaching a compound actuator assembly, comprising six actuators, arranged to apply forces corresponding to six degrees of freedom of vibration of the elongate member, between two sets of attachment points, said sets being longitudinally spaced about a section of the elongate member;
  (b) arranging sensing means to sense vibrations in a region of the elongate member; and
  (c) processing signals produced by the sensing means to produce control signals to control the compound actuator assembly to apply forces to the elongate member so as to create a reflection region from which vibrations, propagating along the elongate member from the source of unwanted vibrations, are reflected to thereby isolate a region of the elongate member, separated from the source of vibration by the compound actuator assembly, from the vibrations.

20. A method according to claim 19, wherein the signals produced by the sensing means are processed by an adaptive control system to produce said control signals.

21. A method according to claim 19, wherein step (b) comprises arranging sensing means to sense vibrations in the region of the elongate member to be isolated from the vibrations.

22. A method of active vibration control of an elongate member whereby a source of unwanted vibrations acting on one region of the elongate member is prevented from being transmitted to another region of the member, comprising the steps of:
  (a) attaching a compound actuator assembly, comprising first and second radially outwardly extending flanges, longitudinally spaced along the elongate member, and six length-changing actuators attached to and extending between the flanges, wherein the actuators are arranged in a zig-zag manner about the elongate member;
  (b) arranging sensing means to sense vibrations in a region of the elongate member; and
  (c) processing signals produced by the sensing means to produce control signals to control the compound actuator assembly to apply forces to the elongate member so as to create a reflection region from which vibrations, propagating along the elongate member from the source of unwanted vibrations, are reflected to thereby isolate a region of the elongate member, separated from the source of unwanted vibrations by the compound actuator assembly, from the vibrations.

23. A method according to claim 22, wherein the signals produced by the sensing means are processed by an adaptive control system to produce said control signals.

24. A method according to claim 22, wherein step (b) comprises arranging sensing means to sense vibrations in the region of the elongate member to be isolated from said vibrations.

25. A method of active vibration control of an elongate member whereby a source of unwanted vibrations acting on one region of the elongate member is prevented from being transmitted to another region of the member, comprising the steps of:
  (a) attaching a compound actuator assembly, comprising first and second radially outwardly extending flanges, longitudinally spaced along the elongate member, and six length-changing actuators attached to and extending between the flanges, wherein each flange is provided with three attachment points, each attachment point attaching two actuators to its respective flange such that the actuators are arranged in a zig-zag manner about the elongate member;
  (b) arranging sensing means to sense vibrations in a region of the elongate member; and
  (c) processing signals produced by the sensing means to produce control signals to control the compound actuator assembly to apply forces to the elongate member so as to create a reflection region from which vibrations, propagating along the elongate member from the source of unwanted vibrations, are reflected to thereby isolate a region of the elongate member, separated from the source of unwanted vibrations by the compound actuator assembly.

26. A method according to claim 25, wherein the signals produced by the sensing means are processed by an adaptive control system to produce said control signals.

27. A method according to claim 25, wherein step (b) comprises arranging sensing means to sense vibrations in the region of the elongate member to be isolated from said vibrations.

* * * * *